United States Patent
Takahashi et al.

(10) Patent No.: US 8,630,480 B2
(45) Date of Patent: *Jan. 14, 2014

(54) IMAGE PROCESSING APPARATUS, DISPLAY APPARATUS, IMAGE PROCESSING METHOD AND IMAGE PROCESSING PROGRAM

(75) Inventors: Shuichi Takahashi, Kanagawa (JP); Yasuhide Hyodo, Tokyo (JP)

(73) Assignee: Sony Corporation, Tokyo (JP)

( * ) Notice: Subject to any disclaimer, the term of this patent is extended or adjusted under 35 U.S.C. 154(b) by 126 days.

This patent is subject to a terminal disclaimer.

(21) Appl. No.: 13/293,416

(22) Filed: Nov. 10, 2011

(65) Prior Publication Data

US 2012/0134574 A1 May 31, 2012

(30) Foreign Application Priority Data

Nov. 29, 2010 (JP) ................... 2010-265647

(51) Int. Cl.
*G06K 9/00* (2006.01)
*G06K 9/40* (2006.01)

(52) U.S. Cl.
USPC .......................................... 382/154; 382/255

(58) Field of Classification Search
USPC ................... 382/167, 254, 255, 270, 274, 154
See application file for complete search history.

(56) References Cited

U.S. PATENT DOCUMENTS

| 7,907,134 B2 * | 3/2011 | Aoki et al. .................... 345/204 |
| 7,911,516 B2 * | 3/2011 | Iijima et al. .................... 348/264 |
| 8,285,040 B1 * | 10/2012 | Movshovich et al. ........ 382/167 |
| 2005/0089212 A1 | 4/2005 | Mashitani et al. |

FOREIGN PATENT DOCUMENTS

| JP | 2001-238231 | 8/2001 |
| JP | 3749227 | 12/2005 |

* cited by examiner

*Primary Examiner* — Daniel Mariam
(74) *Attorney, Agent, or Firm* — Dentons US LLP

(57) ABSTRACT

Disclosed herein is an image processing apparatus including: a depth-information extraction section; a luminance extraction section; a contrast extraction section; a gain generation section; and a correlation estimation section.

17 Claims, 15 Drawing Sheets

FIG. 5
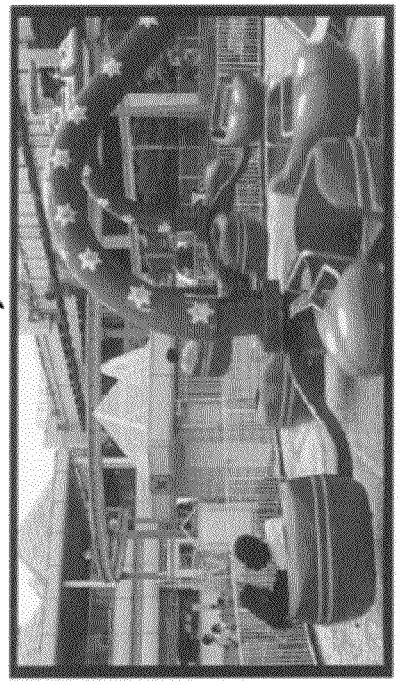
<RAW IMAGE R OF 0TH FRAME>
31R
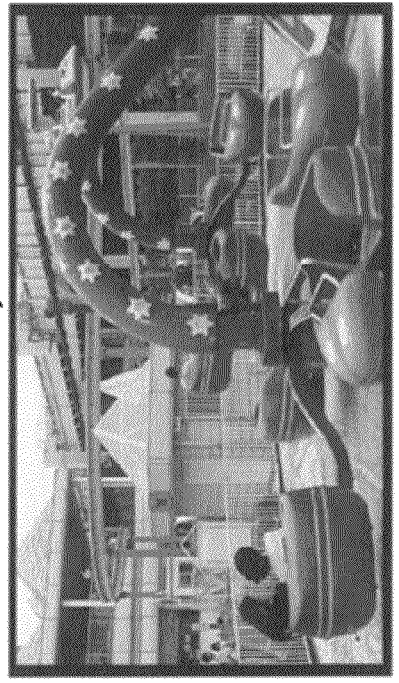
<RAW IMAGE L OF 0TH FRAME>
31L

<DISPARITY MAP:0TH FRAME>

32L

<GAIN MAP $CG_0$ : 0TH FRAME>

33L

<RAW IMAGE L OF 1ST FRAME>

34L

FIG. 9
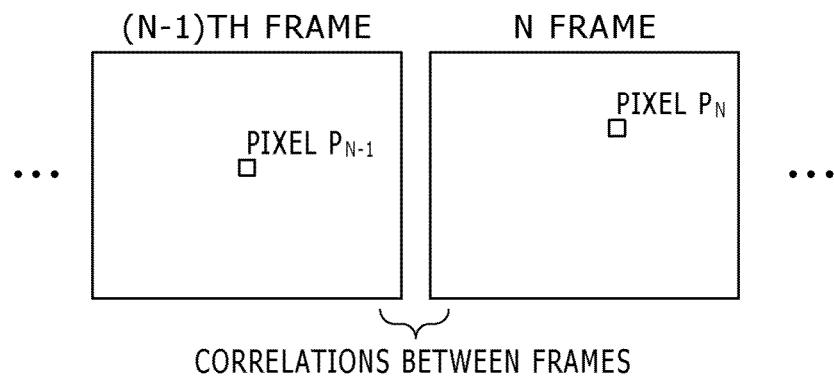
CORRELATIONS BETWEEN FRAMES
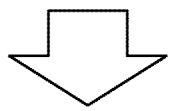
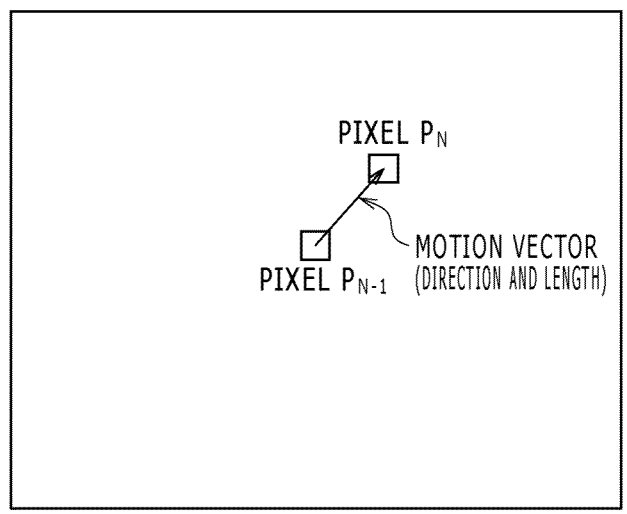

<GAIN MAP $EG_1$ : 1ST FRAME>

36L

FIG. 12
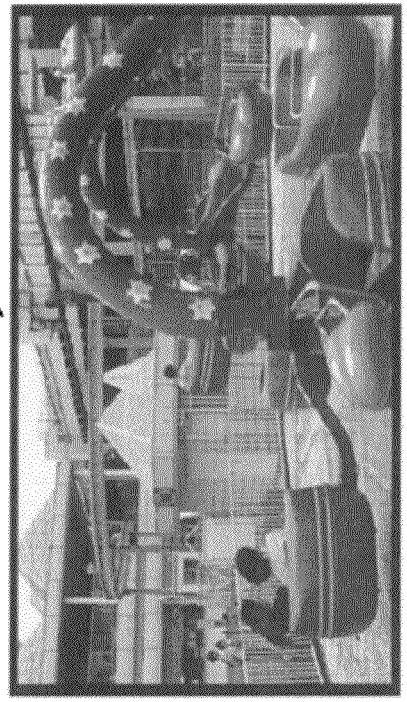
<RAW IMAGE R OF 5TH FRAME>
37R
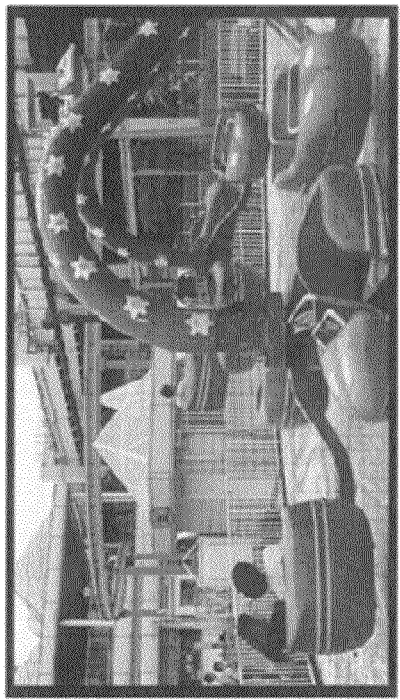
<RAW IMAGE L OF 5TH FRAME>
37L <GAIN MAP EG$_5$ : 5TH FRAME>

38L

IMAGE PROCESSING APPARATUS, DISPLAY APPARATUS, IMAGE PROCESSING METHOD AND IMAGE PROCESSING PROGRAM

BACKGROUND

The present disclosure relates to an image processing apparatus, a display apparatus, an image processing method and an image processing program.

In recent years, attention is paid to a technology for stereoscopically display an image by making use of a binocular disparity which is a horizontal-direction shift between a left-eye-oriented image and a right-eye-oriented image, and the technology has been realized. In a stereoscopic display, the larger the binocular disparity, the more the image is seen as if the image were protruded to the front side or seen as if the image were dented to the rear side. Thus, by increasing the binocular disparity, a stringency can be output to the stereoscopic display. However, there is a risk that the visual sense of the viewer will be tired.

Thus, in order to reduce the fatigue of the visual sense of the viewer, there has been proposed a method for adjusting the binocular disparity. As an example, Japanese Patent No. 3749227 discloses a technology for adjusting the binocular disparity by presenting a plurality of sample images with binocular disparities set at different values to the viewer and letting the viewer give a response to indicate whether or not the presented images can be tolerated. In addition, as another example, Japanese Patent Laid-open No. 2001-238231 discloses a technology for emphasizing a sense of depth by varying the characteristics of the blurring state of an object in an image, the shielding relation of the object and the shade of the object in accordance with the inward-direction position of the object.

SUMMARY

In accordance with the technology disclosed in Japanese Patent No. 3749227, however, in order to reduce the fatigue of the visual sense of the viewer, basically, the binocular disparity is adjusted in a direction to reduce the stereoscopic sense and a direction to reduce the sense of depth. In consequence, the realistic sense and/or the reality are inevitably lost. In addition, if the stereoscopic sense and the sense of depth which are perceived from binocular three-dimensional information are different from the stereoscopic sense and the sense of depth which are perceived from single-eye three-dimensional information, unnaturalness is resulted in. On top of that, Japanese Patent Laid-open No. 2001-238231 does not concretely describe what parameters are to be set, what computation formulas are to be used as bases for setting the parameters and what values at which the parameters are to be set are used. Even if a value is set on a trial-and-error basis, the resulting left-eye-oriented two-dimensional image and the resulting right-eye-oriented two-dimensional image are not guaranteed to be natural and pleasant for a human being. Rather, it is quite within the bounds of possibility that the resulting left-eye-oriented two-dimensional image and the resulting right-eye-oriented two-dimensional image are unnatural and unpleasant for a human being and also cause a visual-sense fatigue as well.

On the other hand, it is possible to make use of a human-being visual-sense characteristic indicating the degree to which the depth is perceived from single-eye two-dimensional information. For example, in accordance with the aerial perspective which is a sort of single-eye two-dimensional information, according to the level of contrast for a substance, a human being is capable of empirically feeling the distance between the human being and the substance. Thus, in processing carried out on an image by making use of contrast components, raising the contrast of an object displayed at a position on the front side will display the object at a location further shifted forward in the front-side direction from the current front-side position whereas lowering the contrast of an object displayed at a position on the rear side will display the object at a location further shifted backward in the rear-side direction from the current rear-side position. It is thus possible to adjust contrast components of an image on the basis of such a characteristic of the visual sense.

In this case, if the processed image is a standstill image, contrast components are adjusted for every image. For a case in which the processed image is a moving image, on the other hand, if the same processing as that of a standstill image is applied to all frames, independent processing is carried out for every frame so that there is no information on correlations between preceding and succeeding frames. Thus, depth information (information on disparities) is extracted for each frame in order to create a disparity map. Since an error is included in the extracted depth information, the depth information is extracted incorrectly for an area as if there were a change in depth between original frames for the area in some cases even if, for the area, there is actually no change in depth between the original frames. As a result, the disparity map varies from frame to frame and the contrast adjustment gain varies slightly for every frame. Accordingly, an eyesore phenomenon such as an appearance of flickers may occur in some cases.

It is thus an aim of the present disclosure, which addresses the problems described above, to provide an image processing apparatus capable of estimating correlations between frames at times contrast components of the frames are adjusted in a three-dimensional moving image. In addition, it is another object of the present disclosure to provide a display apparatus provided for the image processing apparatus, an image processing method adopted by the image processing apparatus and an image processing program implementing the image processing method.

In order to solve the problems described above, in accordance with a mode of the present disclosure, there is provided an image processing apparatus employing:

a depth-information extraction section for extracting the depth information of the image of an Mth frame of an input three-dimensional moving image;

a luminance extraction section for extracting luminance components of the image of the Mth frame of the input three-dimensional moving image;

a contrast extraction section for extracting contrast components of the image of the Mth frame of the input three-dimensional moving image on the basis of the luminance components of the image of the Mth frame;

a gain generation section for computing a gain map CG for adjusting contrast components of the image of the Mth frame on the basis of the contrast components of the image of the Mth frame and the depth information of the image of the Mth frame; and a correlation estimation section for computing values of correlations between images of at least 2 frames including an (N−1)th frame and an Nth frame (where N>0).

The gain generation section estimates a gain map EG for adjusting the contrast components of the image of the Nth frame from the computed gain map CG for adjusting the contrast components of the image of the Mth frame and the computed correlation values.

In addition, it is also possible to provide a configuration in which the Mth frame is configured from a 0th frame and/or a Kth frame where K is a multiple of a period value which is the value of a reset period.

In addition, it is also possible to provide a configuration in which the correlation estimation section computes the value of a correlation between the Nth frame and the (N−1)th frame whereas the gain generation section estimates the gain map EG for adjusting contrast components of the Nth frame from the gain map EG for adjusting contrast components of the (N−1)th frame by making use of the computed value of the correlation between the Nth and (N−1)th frames.

In addition, it is also possible to provide a configuration in which the correlation estimation section repeatedly carries out the processing to compute the value of a correlation between the Nth frame and the (N−1)th frame for all frames except the 0th frame whereas the gain generation section repeatedly carries out the processing to estimate the gain map EG for adjusting contrast components of the Nth frame from the computed correlation value and the gain map EG for adjusting contrast components of the (N−1)th frame for all frames except the 0th frame.

In addition, it is also possible to provide a configuration in which, if the Nth frame matches the Mth frame, the gain generation section carries out adding and averaging processing or weighted addition processing making use of weights determined in advance on the estimated gain map EG for adjusting contrast components of the Nth frame and the computed gain map CG for adjusting contrast components of the Mth frame in order to generate a gain map MG for adjusting the contrast components of the Nth frame.

In addition, it is also possible to provide a configuration in which the period value for M frames is set at a variable value determined on the basis of a change of the input moving image.

In addition, it is also possible to provide a configuration in which, the larger the movement of the input moving image, the smaller the value at which the period value for the M frames is set or, the smaller the movement of the input moving image, the larger the value at which the period value for the M frames is set.

In addition, it is also possible to provide a configuration in which the correlation value is computed by making use of a movement prediction technology.

In addition, it is also possible to provide a configuration further including a spatial-frequency component extraction section for extracting spatial-frequency components of the image of the Mth frame on the basis of the luminance components of the image of the Mth frame. In this configuration, the gain generation section computes a gain map CG for adjusting contrast components of the image of the Mth frame on the basis of the contrast components of the image of the Mth frame, the spatial-frequency components of the image of the Mth frame and the depth information of the image of the Mth frame.

In addition, it is also possible to provide a configuration further including a contrast adjustment section for adjusting the contrast components of the image the Nth frame by making use of the computed gain map CG for adjustment of contrast components, the estimated gain map EG for adjustment of contrast components or the generated gain map MG for adjustment of contrast components.

In addition, it is also possible to provide a configuration further including a display apparatus for displaying the image of every frame whose contrast components have been adjusted by the image processing apparatus.

In addition, in order to solve the problems described above, in accordance with another mode of the present disclosure, there is provided an image processing method having:

a depth-information extraction step of extracting the depth information of the image of an Mth frame of an input three-dimensional moving image;

a luminance extraction step of extracting luminance components of the image of the Mth frame of the input three-dimensional moving image;

a contrast extraction step of extracting contrast components of the image of the Mth frame of the input three-dimensional moving image on the basis of the luminance components of the image of the Mth frame;

a gain generation step of computing a gain map CG for adjusting contrast components of the image of the Mth frame on the basis of the contrast components of the image of the Mth frame and the depth information of the image of the Mth frame; and a correlation estimation step of computing values of correlations between images of at least 2 frames including an (N−1)th frame and an Nth frame (where N>0).

The gain generation step includes a step of estimating a gain map EG for adjusting the contrast components of the image of the Nth frame from the computed gain map CG for adjusting the contrast components of the image of the Mth frame and the computed correlation values.

On top of that, in order to solve the problems described above, in accordance with a further mode of the present disclosure, there is provided an image processing program to be executed by a computer in order to carry out processing including:

a depth-information extraction process of extracting depth information of the image of an Mth frame of an input moving image;

a luminance extraction process of extracting luminance components of the image of the Mth frame of the input moving image;

a contrast extraction process of extracting contrast components of the image of the Mth frame of the input moving image on the basis of the luminance components of the image of the Mth frame;

a gain generation process of computing a gain map CG for adjusting contrast components of the image of the Mth frame on the basis of the contrast components of the image of the Mth frame and the depth information of the image of the Mth frame; and a correlation estimation process of computing values of correlations between images of at least two frames including an (N−1)th frame and an Nth frame (where N>0).

The gain generation process includes a process of estimating a gain map EG for adjusting the contrast components of the image of the Nth frame from the computed gain map CG for adjusting the contrast components of the image of the Mth frame and the computed correlation values.

In addition, in order to solve the problems described above, in accordance with a still further mode of the present disclosure, there is provided an image processing apparatus having:

a correlation estimation section for computing values of correlations between images of two input consecutive frames; and a gain generation section for computing a gain map CG for adjusting contrast components of an input image on the basis of contrast components of the input image as well as the depth information of the input image and for estimating a gain map EG for adjusting the contrast components of the input image from the gain map CG and the correlation values.

In addition, it is also possible to provide a configuration in which the gain generation section estimates a gain map EG of the image of the Nth frame from the gain map CG of the image of the (N−1)th frame as well as the values of correlations between the (N−1)th and Nth frames.

In addition, it is also possible to provide a configuration in which the gain generation section estimates a gain map EG of the image of the Pth frame from the gain map EG of the image of the (P−1)th frame as well as the value of a correlation between the (P−1)th and Pth frames.

In addition, it is also possible to provide a configuration in which the gain generation section carries out adding and averaging processing or weighted addition processing making use of weights determined in advance on the gain map EG of the image of the Qth frame and the gain map CG of the image of the Qth frame in order to generate a gain map MG of the image of the Qth frame.

In addition, in order to solve the problems described above, in accordance with a still further mode of the present disclosure, there is provided an image processing apparatus including:

a gain generation section configured to compute first gains on the basis of contrast components of the image of a first frame and depth information of the image of the first frame;

a contrast adjustment section configured to adjust contrast components of the image of the first frame on the basis of the first gains; and a correlation estimation section configured to compute values of correlations between the image of the first frame and the image of a second frame.

The contrast adjustment section adjusts contrast components of the image of the second frame on the basis of the first gains and the correlation values.

As described above, in accordance with the present disclosure, at a contrast adjustment time of every frame in a three-dimensional moving image, correlations between frames are estimated in order to provide the viewer with a smooth three-dimensional moving image whose sense of depth has been corrected appropriately.

BRIEF DESCRIPTION OF THE DRAWINGS

FIG. 5 is a diagram showing a typical left-eye-oriented raw image to be processed by the image processing apparatus according to the embodiment as an image of the 0th frame and a typical right-eye-oriented raw image to be processed by the image processing apparatus as an image of the 0th frame;

FIG. 9 is an explanatory diagram to be referred to in description of an operation prediction technology;

FIG. 12 is a diagram showing a typical left-eye-oriented raw image of the fifth frame and a typical right-eye-oriented raw image of the fifth frame;

DETAILED DESCRIPTION OF THE PREFERRED EMBODIMENT

Figure 1:
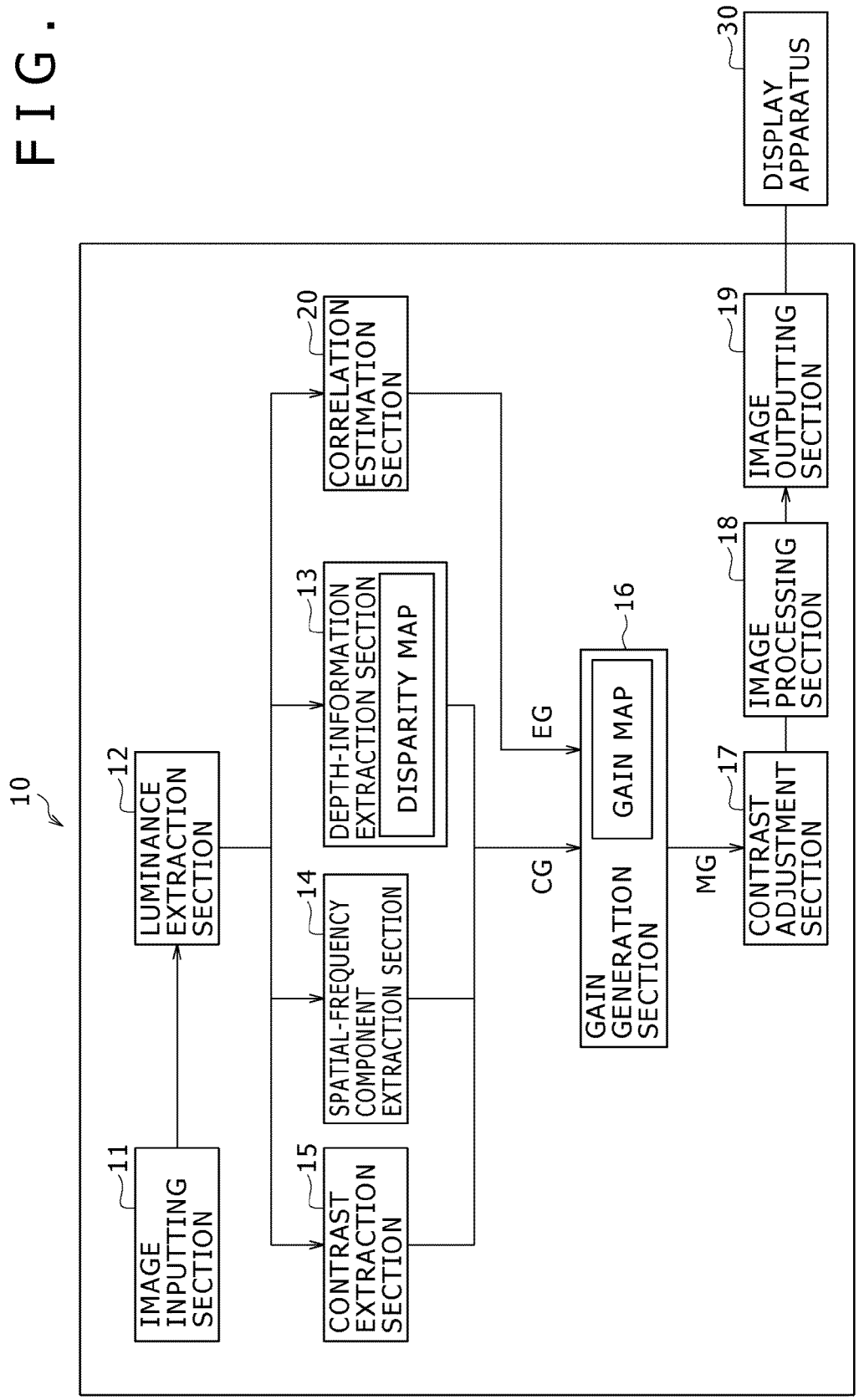
FIG. 1 is a diagram showing the entire configuration of an image processing apparatus according to an embodiment of the present disclosure.

An embodiment of the present disclosure is explained by referring to the diagrams as follows. It is to be noted that, in the specification of the present disclosure and the diagrams, configuration elements having virtually identical functional configurations are each denoted by the same reference numeral so that such configuration elements need to be explained only once. Thus, it is possible to avoid duplications of explanations.

It is also worth noting that the embodiment is explained in chapters arranged as follows.
First Embodiment
   Functional Configuration of the Image Processing Apparatus
   Moving Images and Frame Correlations
Operations of the Image processing Apparatus
   Contrast Adjustment Processing
   Processing to Compute a Gain Map $CG_N$
   Processing to Estimate a Gain Map $EG_N$
   Processing to Generate a Gain Map $MG_N$ First Embodiment Functional Configuration of the Image Processing Apparatus First of all, the functional configuration of an image processing apparatus 10 according to an embodiment is explained by referring to a functional block diagram of FIG. 1.

As shown in the figure, the image processing apparatus 10 employs an image inputting section 11, a luminance extraction section 12, a depth-information extraction section 13, a spatial-frequency component extraction section 14, a contrast extraction section 15, a gain generation section 16, a contrast adjustment section 17, an image processing section 18, an image outputting section 19 and a correlation estimation section 20.

The image processing apparatus 10 carries out processing to adjust contrast components of the image of every frame of an input three-dimensional moving image in order to strengthen or weaken the depth sense of the image of every frame. In this case, a three-dimensional image is two-dimensional images used for allowing the viewer to perceive the three-dimensional image. In this embodiment, the image of every frame of a three-dimensional moving image is configured as three-dimensional image.

The image inputting section 11 receives a three-dimensional moving image from an external source and supplies the three-dimensional moving image of every input frame to the luminance extraction section 12. There are a variety of formats for the data of a three-dimensional moving image received from the external source. However, the image inputting section 11 is capable of receiving a three-dimensional moving image having any data format. Typical examples of the data format are first, second and third data formats. In the case of the first data format, a three-dimensional moving image is received in the form of a stereo image configured from an image L oriented for the left eye and an image R oriented for the right eye. In the case of the second data format, a three-dimensional moving image is received in the form of a multi-observing-point image configured from at least three observing-point images. In the case of the third data format, a three-dimensional moving image is received in the form of a two-dimensional image and the depth information of the two-dimensional image.

In the following description, when specified as a subject of processing, an image or a luminance image implies both an image L oriented for the left eye and an image R oriented for the right eye in the case of the first data format, implies one of a plurality of observing-point images in the case of the second data format or implies a two-dimensional image and the depth information of the two-dimensional image in the case of the third data format.

The luminance extraction section 12 extracts the luminance components of the image of the Mth frame of the input three-dimensional moving image. The Mth frame is configured from a 0th frame and a Kth frame where K is a multiple of a period value which is the value of a reset period. The period value will be described later in detail.

If the image is represented by linear RGB values of an RGB color coordinate system for example, the luminance extraction section 12 extracts the luminance components of the input three-dimensional moving image by converting the RGB values into a luminance value Y in accordance with Eq. (1) given below as an equation conforming to the ITU-R BT709 standard:

$$Y = 0.2126R + 0.7152G + 0.0722B \quad (1)$$

In accordance with Eq. (1), an image expressed in terms of the luminance values Y of pixels is referred to as a luminance image. It is to be noted that the image does not have to be expressed in terms of luminance values Y (or RGB signals). For example, the image can also be expressed in terms of XYZ values of a CIE XYZ color coordinate system. In this case, the image expressed in terms of luminance values Y is handled as a luminance image. In addition, the extraction of the luminance value does not have to be carried out in accordance with Eq. (1). That is to say, the luminance value can also be extracted by adoption of another technique.

The depth-information extraction section 13 extracts the depth information of the image of the Mth frame of the input three-dimensional moving image, generating a disparity map. To put it concretely, the image inputting section 11 may supply the input three-dimensional moving image to the depth-information extraction section 13 which then extracts the depth information of the image of the Mth frame of the input three-dimensional moving image treated as the subject of processing or, as an alternative, the luminance extraction section 12 provides the depth-information extraction section 13 with a luminance signal as the subject of processing.

If the three-dimensional moving image is received as a stereo image having the first data format, the depth-information extraction section 13 computes the so-called binocular disparity which is an image shift between corresponding points on the stereo image. Then, the depth-information extraction section 13 approximately computes the depth information on the basis of the computed binocular disparity.

The depth-information extraction section 13 is capable of computing the binocular disparity by adoption of a technique such as a block matching technique or a DP matching technique.

In addition, if the three-dimensional moving image is received as a multi-observing-point image having the second data format, the depth-information extraction section 13 computes the binocular disparity of two observing-point images selected from the three or more observing-point images and then approximately computes the depth information on the basis of the computed binocular disparity.

On top of that, if the three-dimensional moving image is received as a two-dimensional image having the third data format and the depth information of the two-dimensional image, the depth-information extraction section 13 receives the depth information itself. Thus, the depth-information extraction section 13 merely extracts the depth information.

The spatial-frequency component extraction section 14 extracts predetermined spatial-frequency components of the three-dimensional moving image on the basis of the luminance components extracted by the luminance extraction section 12. The spatial-frequency component extraction section 14 is capable of extracting the predetermined spatial-frequency components by making use of typically a Gabor filter. The Gabor filter is said to approximate a signal response characteristic of a visual sense system and has a function $g(x, y, \lambda, \theta, \psi, \sigma, \gamma)$ expressed by Eq. (2) given as follows:

$$g(x, y, \lambda, \theta, \psi, \sigma, \gamma) = \exp\left(-\frac{(x\cos\theta + y\sin\theta)^2 + \gamma^2(-x\sin\theta + y\cos\theta)^2}{2\sigma^2}\right)\cos\left(2\pi\frac{x\cos\theta + y\sin\theta}{\lambda} + \psi\right) \quad (2)$$

In Eq. 2, notations x and y denote coordinate values of the luminance image whereas notation $\lambda$ denotes the wavelength corresponding to the spatial frequency. Notations $\theta$ and $\psi$ denote the azimuth direction and the phase respectively. Notation $\sigma$ denotes the variance of the Gauss distribution whereas notation $\gamma$ denotes a spectral ratio, In addition, in this case, the spatial frequency is defined by shading changes (contrast) entering the inside of a 1-degree visual sense of an eye of a human being as the shading changes (contrast) of white and black colors. The unit of the spatial frequency is a cpd (cycle per degree).

For example, the spatial-frequency component extraction section 14 carries out convolution integration on the function $g(x, y, \lambda, \theta, \psi, \sigma, \gamma)$ expressed by Eq. (2), in which notation $\lambda$ represents a wavelength determined in advance, as a function of the Gabor filter and on the luminance Y of the luminance image extracted by the luminance extraction section 12. The spatial-frequency component extraction section 14 carries out such convolution integration in order to extract information indicating which spatial frequency component is included in which area of the luminance image.

It is to be noted that the method for extracting a spatial frequency component included in every area of the luminance image does not have to be the method described above. For example, a spatial frequency component included in every area of the luminance image can also be extracted by adoption the Fourier transform or the like. In this case, however, in order to extract a spatial frequency component included in every area of the luminance image, it is necessary to divide the luminance image into areas and, then, carry out the Fourier transform for each of the areas. In addition, the processing carried out by the spatial-frequency component extraction section 14 is processing required to change an evaluation function applicable in the contrast adjustment section 17 for every spatial frequency determined in advance. Thus, if the same evaluation function as that applied in the contrast adjustment section 17 is applied for the entire luminance image, the processing carried out by the spatial-frequency component extraction section 14 can be eliminated.

It is to be noted that, as far as the evaluation function is concerned, information on an evaluation function described in Japanese Patent Laid-open No. 2009-270077 can be applied also to this specification of an application for a patent.

The contrast extraction section 15 extracts contrast components of the three-dimensional moving image by making use of luminance components extracted by the luminance extraction section 12 as the luminance components of the three-dimensional moving image. As an example, the contrast extraction section 15 takes an area having a horizontal size of n pixels and a vertical size of m pixels where n and m≥2 as a processing unit area which is the unit of processing carried out by the contrast extraction section 15 to extract contrast components. The contrast extraction section 15 computes a Michelson contrast C for each of a plurality of processing unit areas spread over the entire luminance image by moving the processing unit area from typically the position on a left upper edge of the luminance image in the raster scan direction by a distance corresponding to a pixel count determined in advance at one movement.

The Michelson contrast C is defined by Eq. (3) given as follows:

$$C = \frac{L_{max} - L_{min}}{L_{max} + L_{min}} \quad (3)$$

In Eq. (3) given above, notation $L_{max}$ denotes the maximum value of luminance values Y in a processing unit area whereas notation $L_{min}$ denotes the minimum value of the luminance values Y in the same processing unit area.

It is to be noted that the method for extracting the contrast components of the three-dimensional moving image does not have to be the method described above. That is to say, the contrast components of the three-dimensional moving image can also be extracted by adoption of another method. In addition, the size of the processing unit area is not specially limited to a particular value. For example, an optimum size of the processing unit area can be determined from an angle of vision and the number of pixels.

The depth-information extraction section 13 extracts depth information of a three-dimensional moving image by making use of luminance components extracted by the luminance extraction section 12 as luminance components of the three-dimensional moving image. Then, on the basis of the depth information, the depth-information extraction section 13 creates a disparity map having information on binocular disparities.

On the basis of the contrast components extracted by the contrast extraction section 15 and the disparity map created by the depth-information extraction section 13, the gain generation section 16 computes a contrast-adjustment-oriented gain map CG used for changing the depth sense of the three-dimensional moving image. As explained before, if the spatial-frequency component extraction section 14 has extracted spatial frequency components, the spatial frequency components, the contrast components and the depth information are used in the processing carried out by the gain generation section 16 to calculate the gain map CG. It is to be noted that, a suffix appended to each of the contrast-adjustment-oriented gain maps CG, EG and MG explained for a frame in the description of this embodiment denotes a number assigned to the frame. For example, the contrast-adjustment-oriented gain maps CG, EG and MG for a frame having a frame number n are denoted by $CG_N$, $EG_N$ and $MG_N$ respectively where notation n is the suffix described above.

The following description explains the processing carried out by the gain generation section 16 for a case in which no spatial frequency components have been extracted. First of all, on the basis of the depth information included in the disparity map, the gain generation section 16 recognizes areas on the rear side of a three-dimensional luminance image and areas on the front side of the three-dimensional luminance image. In this case, the size of the smallest unit of areas divided into the areas on the rear side and the areas on the front side is essentially equal to the size of the processing unit area used by the contrast extraction section 15 in the computation of the Michelson contrast C. For all processing unit areas included in the areas on the rear side and the areas on the front side, the gain generation section 16 computes a subjective depth quantity D in which the input image exists presently from the Michelson contrast C.

Since a monotonous relation exists between the Michelson contrast C and the subjective depth quantity D, in order to compute the depth sense of the three-dimensional moving image for example, it is nice to adjust the contrast components of the luminance image so as to increase the Michelson contrast C. The subjective depth quantity D for a processing unit area already subjected to adjustment of contrast components is determined from the computed subjective depth quantity D and a depth quantity set in advance. That is to say, for all processing unit areas, the gain generation section 16 determines a multiplier to be multiplied by the present Michelson contrast C used as a multiplicand from the present subjective depth quantity D and the depth information of the image and creates a gain map from the result of the determination.

The contrast adjustment section 17 makes use of a gain included in the gain map as a gain for adjustment of contrast components in order to adjust a contrast component of the three-dimensional moving image. Thus, it is possible to carry out image displaying control making use of the aerial perspective for making an image area visible on the front side by raising the contrast of the area and making an image area visible on the rear side by lowering the contrast of the area.

The image processing section 18 generates a luminance image completing the adjustment of contrast components on the basis of an adjustment result produced by the contrast adjustment section 17. To put it concretely, the image processing section 18 carries out inverse Fourier transform on the spectral strength of every spatial frequency component included in each processing unit area as a component completing the adjustment of contrast components in order to compute a luminance image with every processing unit area thereof completing the adjustment of contrast components.

The image outputting section 19 converts an image obtained by combining the luminance image generated by the image processing section 18 with original color information of the input image into a three-dimensional image having the same frames as the frames supplied to the image inputting section 11 and supplies the three-dimensional image to the display apparatus 30. If the data format of the output three-dimensional image has been specified, the image outputting section 19 may supply the three-dimensional image to the display apparatus 30 after converting the data format of the three-dimensional image into the specified data format. It is to be noted that the display apparatus 30 for displaying a moving image can be integrated with the image processing apparatus 10 or separated from the image processing apparatus 10. If the display apparatus 30 is separated away from the image processing apparatus 10, the display apparatus 30 and the image processing apparatus 10 can be connected to each other by making use of a network.

The above description has explained a technology for adjusting contrast components of an image on the basis of a quantitative relation of a visual-sense characteristic indicating the degree to which a depth is perceived from single-eye three-dimensional information.

Moving Images and Frame Correlations

If the image processed is a standstill image, contrast components are adjusted for every three-dimensional image as described above. For a case in which the image processed is a moving image, however, if the same processing as that of a standstill image is applied to all frames, independent processing is carried out for every frame so that there is no information on succession from a preceding frame to a succeeding frame. Thus, depth information (disparity) is extracted for each frame in order to create a disparity map. Since an error is included in the extracted depth information, the depth information is extracted incorrectly for an area as if there were a change in depth between original frames for the area in some cases even if, for the area, there is actually no change in depth between the original frames. As a result, the disparity map varies from frame to frame and the contrast adjustment gain varies slightly for every frame. Thus, an eyesore phenomenon such as an appearance of flickers may occur in some cases.

In order to solve the problems described above, the correlation estimation section 20 computes values of correlations between the images of two consecutive frames by adoption of a movement prediction technology. For example, the (N−1)th and Nth frames (where N>0) are two consecutive frames. In this case, the correlation estimation section 20 computes values of correlations between the images of the (N−1)th and Nth frames from motion vectors between the images of the (N−1)th and Nth frames by adoption of the movement prediction technology. The movement prediction technology is a technology for estimating information on a direction in which an image object on a frame is moving and information on the length of a distance by which the object is moving while observing correlations between frames. For example, in a typical case shown in FIG. 9, a motion vector is estimated. The motion vector represents the state of a right-eye-oriented or left-eye-oriented pixel $P_N$ on the Nth frame by taking a right-eye-oriented or left-eye-oriented pixel $P_{N-1}$ on the (N−1)th frame as a reference. The correlation estimation section 20 recognizes each correlation between the (N−1)th and Nth frames for the pixel P in terms of the direction of the motion vector and the length of the vector. Thus, the correlation estimation section 20 is capable of estimating information on an object moving to a location on the next frame and information on the location. The correlation estimation section 20 is capable of computing a motion vector for every pixel included in an image from two consecutive frames. Typical examples of the movement prediction technology include a block matching method and a gradient method.

In accordance with the technology described above, at a time to adjust contrast components of each frame in a three-dimensional moving image, correlations between frames are estimated in order to avoid generation of an eyesore phenomenon such as an appearance of flickers. Thus, it is possible to provide the viewer with a smooth three-dimensional moving image whose sense of depth has been corrected appropriately.

The correlation estimation section 20 repeatedly carries out processing to compute correlation values from images of the Nth and (N−1)th frames (where N>0) for all frames except the 0th frame. The gain generation section 16 repeatedly carries out processing to estimate a contrast-adjustment-oriented gain map EG of the Nth frame from the computed correlation values and a contrast-adjustment-oriented gain map EG of the (N−1)th frame for all frames except the 0th frame. For example, the gain generation section 16 repeatedly carries out processing to estimate a contrast-adjustment-oriented gain map $EG_P$ of the Pth frame from the computed values of correlations between the Pth and (P−1)th frames as well as from a contrast-adjustment-oriented gain map $EG_{P-1}$ of the (P−1)th frame for all frames except the 0th frame. For example, in the case of the Nth frame, that is, for N=1, the gain generation section 16 estimates a gain map $EG_1$ from correlation values and a gain map $CG_0$.

As described above, the reset period value of M frames is a reset period. In this embodiment, however, if it is assumed that the reset period value is set at 5, the gain generation section 16 repeatedly carries out processing to estimate a contrast-adjustment-oriented gain map $EG_N$ of the Nth frame from the computed values of correlations between the Nth and (N−1)th frames as well as from a contrast-adjustment-oriented gain map $EG_{N-1}$ of the (N−1)th frame till the Nth frame serving as the subject of processing becomes a Kth frame where K is equal to a multiple of M (=5) which is the reset period.

As the Nth frame serving as the subject of processing becomes a Kth frame where K is equal to a multiple of M (=5) which is the reset period, on the basis of a disparity map extracted on the basis of the processing described above, the gain generation section 16 computes a gain map $CG_N$ of the fifth frame. Then, the gain generation section 16 carries out processing to add the computed gain map $CG_N$ of the fifth frame to the estimated gain map $EG_N$ of the fifth frame to find a sum and compute an average gain map $MG_N$ of the fifth frame from the sum. As an alternative, the gain generation section 16 carries out weighted addition on the computed gain map $CG_N$ of the fifth frame and the estimated gain map $EG_N$ of the fifth frame by making use of weights determined in advance to find a gain map $MG_N$ of the fifth frame. In the case of the Qth frame for example, the gain generation section 16 carries out processing to add the computed gain map $CG_Q$ of the Qth frame to the estimated gain map $EG_Q$ of the Qth frame to find a sum and compute an average gain map $MG_Q$ of the Qth frame from the sum. As an alternative, the gain generation section 16 carries out weighted addition on the computed gain map $CG_Q$ of the Qth frame and the estimated gain map $EG_Q$ of the Qth frame by making use of weights determined in advance to find a gain map $MG_Q$ of the Qth frame.

If a scene changes all of a sudden for example, information based on motion vectors to serve as information on succession between frames conceivably includes a number of errors. Thus, when the Nth frame serving as the subject of processing becomes a Kth frame where K is equal to a multiple of M which is the reset period, information based on a motion vector to serve as information on succession between frames is reset. In addition, the gain generation section 16 carries out processing to add the computed gain map $CG_N$ to the estimated gain map $EG_N$ in order to find a sum and compute an average gain map $MG_N$ from the sum. As an alternative, the gain generation section 16 carries out weighted addition on the computed gain map $CG_N$ and the estimated gain map $EG_N$ by making use of weights determined in advance in order to find a gain map $MG_N$. As a result, it is possible to prevent errors from being included in the information on succession between frames while reducing the number of flickers.

It is to be noted that a command for each section is issued by a dedicated control device or a CPU for executing programs. The CPU is not shown in the figure. A program to be executed by the CPU to carry out contrast adjustment processing to be described later has been stored in advance in either of a ROM and a nonvolatile memory which are not shown in the figure. The CPU reads out programs from the ROM and the nonvolatile memory and executes the programs in order to implement the functions of the luminance extraction section 12, the depth-information extraction section 13, the spatial-frequency component extraction section 14, the contrast extraction section 15, the gain generation section 16, the contrast adjustment section 17, the image processing section 18 and the correlation estimation section 20.

Operations of the Image Processing Apparatus

Figure 2:
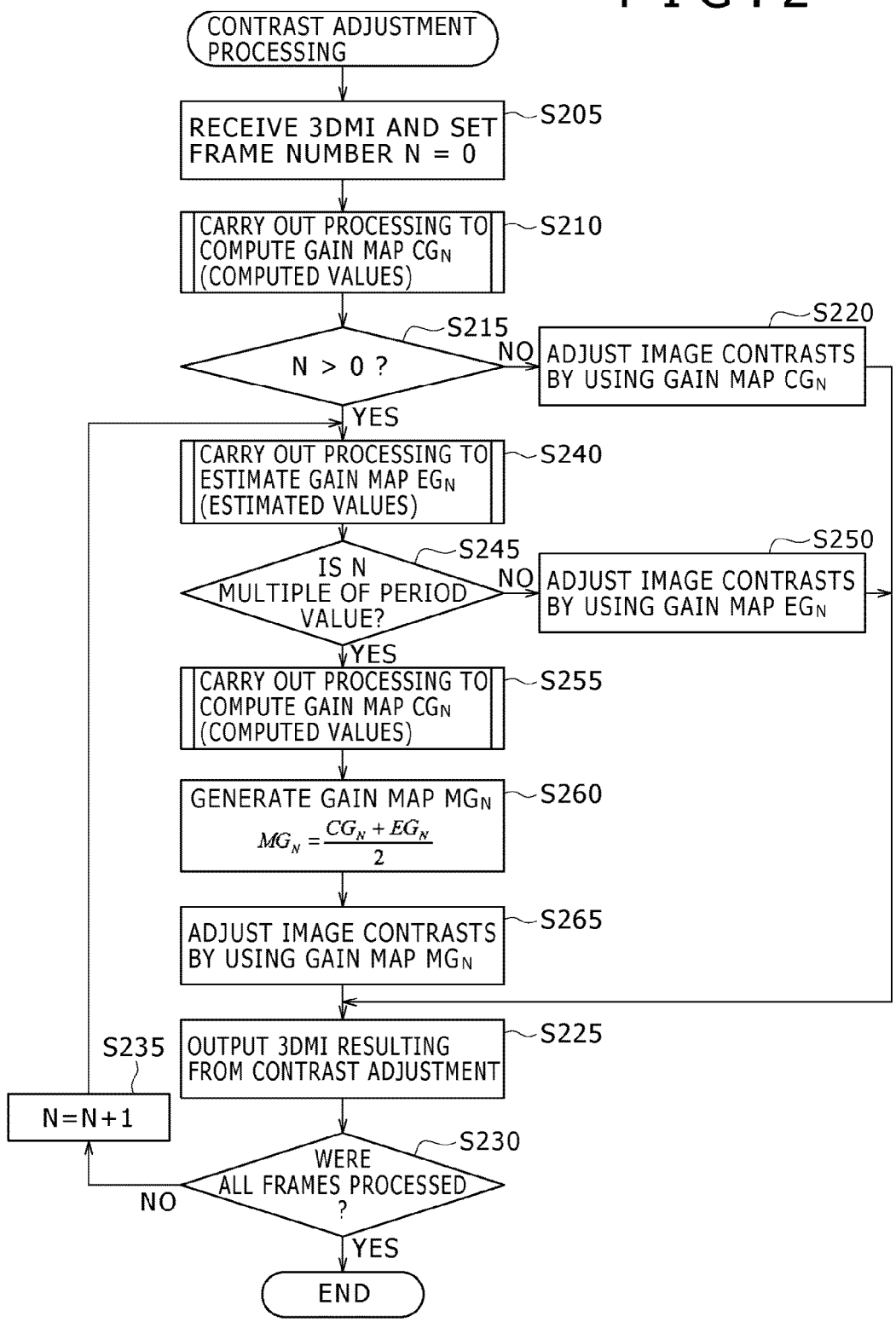
FIG. 2 shows a flowchart representing contrast adjustment processing carried out by the image processing apparatus according to the embodiment of the present disclosure.
Figure 3:
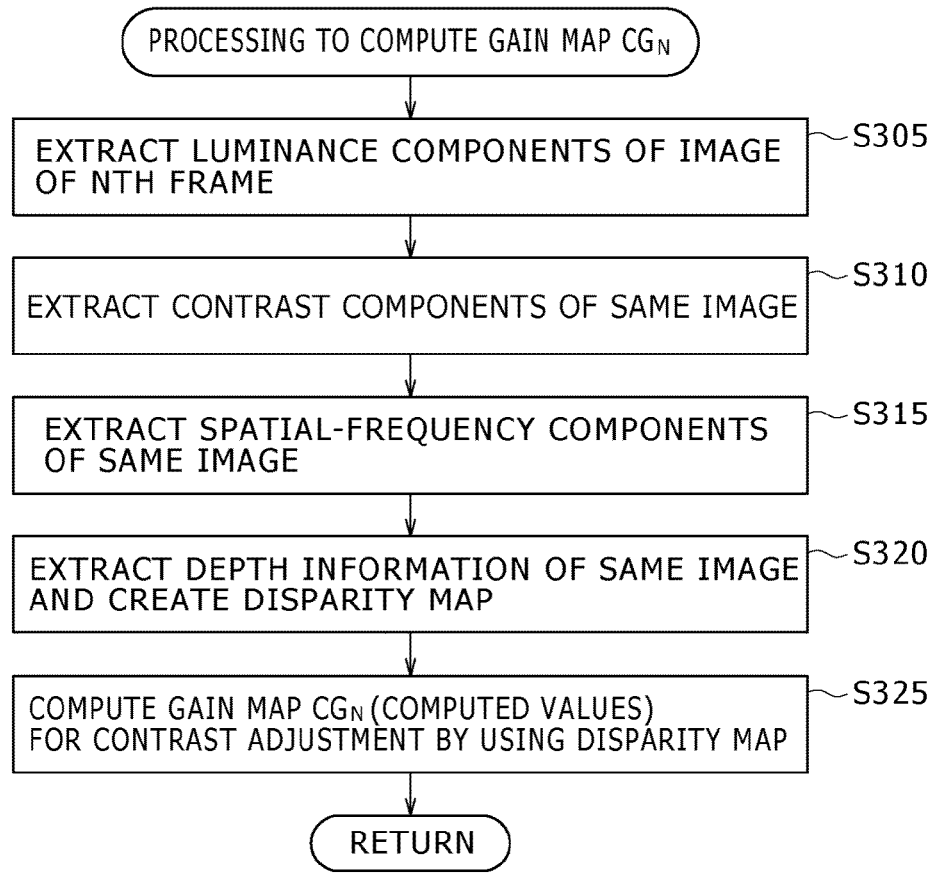
FIG. 3 shows a flowchart representing a process carried out at a step of the flowchart shown in FIG. 2 to compute a gain map CG.
Figure 4:
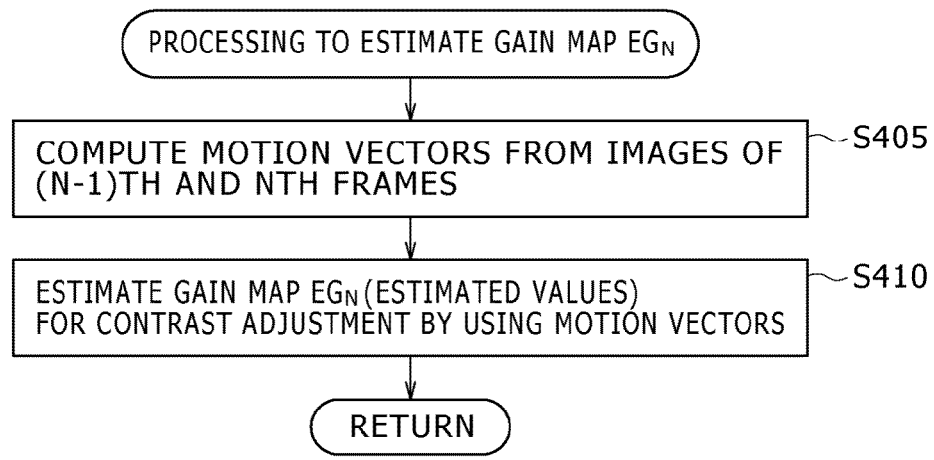
FIG. 4 shows a flowchart representing a process carried out at a step of the flowchart shown in FIG. 2 to estimate a gain map EG.

The contrast adjustment processing carried out by the image processing apparatus 10 is explained by referring to flowcharts shown in FIGS. 2 to 4 as follows. FIG. 2 shows a flowchart representing the contrast adjustment processing carried out by the image processing apparatus 10 according to the embodiment of the present disclosure whereas FIG. 3 shows a flowchart representing a process carried out at a step of the flowchart shown in FIG. 2 to compute a gain map CG. FIG. 4 shows a flowchart representing a process carried out at a step of the flowchart shown of FIG. 2 to estimate a gain map EG. In explanation of every step of each of the flowcharts shown in FIGS. 2 to 4, if necessary, FIGS. 5 to 16 are also referred to.

Contrast Adjustment Processing

The flowchart shown in FIG. 2 begins with a step S205 at which the image inputting section 11 inputs a three-dimensional moving image. For example, the image inputting section 11 inputs frames of the three-dimensional moving image having one of the first, second and third data types sequentially, starting with the 0th frame. In addition, a number N assigned to a frame serving as the subject of processing is set at 0.

FIG. 5 is a diagram showing typical raw images each received as an image having the first data type as a raw image of the 0th frame. An image having the first data type is configured to consist of a left-eye-oriented image 31L and a right-eye-oriented image 31R. Such images are received sequentially from frame to frame, starting with the 0th frame. It is to be noted that the images show persons boarded on a midway ride moving up and down while rotating at an amusement park. The backgrounds of the images each show buildings and other attractions.

Processing to Compute a Gain Map $CG_N$

Then, at the next step S210, a process of computing a gain map $CG_N$ (computed values) is carried out. To put it concretely, the process of computing a gain map $CG_N$ (computed values) is carried out at steps of the flowchart shown FIG. 3. As shown in the figure, the flowchart begins with a step S305 at which the luminance extraction section 12 extracts luminance components from a left-eye-oriented image 31L of the Nth frame and a right-eye-oriented image 31R of the same frame. To be more specific, the luminance extraction section 12 extracts luminance components from a left-eye-oriented image 31L of the 0th frame and a right-eye-oriented image 31R of the same frame. Then, at the next step S310, on the basis of the luminance components extracted by the luminance extraction section 12 from a left-eye-oriented image 31L of the 0th frame and a right-eye-oriented image 31R of the same frame, the contrast extraction section 15 extracts contrast components of the images as contrast components for the left and right eyes.

Figure 6:
FIG. 6 is a diagram showing a typical left-eye-oriented disparity map of the 0th frame.

Subsequently, at the next step S315, on the basis of the luminance components of the left-eye-oriented image 31L and the right-eye-oriented image 31R, the spatial-frequency component extraction section 14 extracts spatial frequency components determined in advance from each of the images. Then, at the next step S320, the depth-information extraction section 13 extracts depth information of the left-eye-oriented image 31L of the 0th frame and the right-eye-oriented image 31R of the same frame. Subsequently, on the basis of the extracted contrast components, the extracted depth information and the extracted spatial frequency components, the spatial-frequency component extraction section 14 generates a disparity map having information on disparities. FIG. 6 is a diagram showing a typical left-eye-oriented disparity map 32L created from the typical left-eye-oriented image of the 0th frame received as a frame having the first data format or its luminance image to serve as a typical left-eye-oriented disparity map of the 0th frame.

Figure 7:
FIG. 7 is a diagram showing a typical left-eye-oriented gain map CG of the 0th frame.

Subsequently, at the next step S325 serving as the last step of the flowchart, on the basis of the disparity map, the gain generation section 16 computes a contrast-adjustment-oriented gain map CG used for changing the depth sense of the three-dimensional moving image. FIG. 7 is a diagram showing a typical left-eye-oriented gain map $CG_0$ computed on the basis of the left-eye-oriented gain map 32L of the 0th frame to serve as a left-eye-oriented gain map $CG_0$ (computed values) of the 0th frame.

When the processing represented by the flowchart shown in FIG. 3 is completed as described above, the flow of the processing goes back to a step S215 of the flowchart shown in FIG. 2. At the step S215, the frame number N is examined in order to determine whether or not the frame number N is greater than 0. At this point of time, the frame number N is 0. Thus, the flow of the processing goes on to a step S220 at which the contrast adjustment section 17 adjusts the contrast components of the three-dimensional moving image by making use of the gain map $CG_0$ (computed values). Then, at the next step S225, on the basis of the result of the contrast adjustment carried out by the contrast adjustment section 17, the image processing section 18 generates a luminance image resulting from the contrast adjustment carried out by the contrast adjustment section 17. Then, the image outputting section 19 converts a combined image into the same specific frame as the three-dimensional moving image supplied to the image inputting section 11 and supplies the three-dimensional moving image obtained as the result of the conversion to the display apparatus 30. The combined image is an image obtained by combining the luminance image generated by the image processing section 18 with the original color information of the input image.

Figure 8:
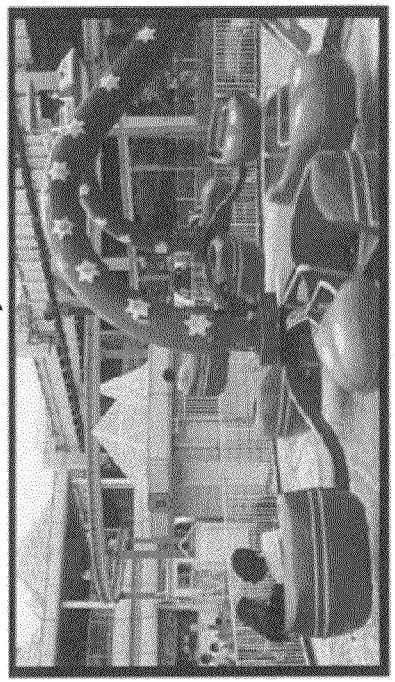
FIG. 8 is a diagram showing a typical left-eye-oriented raw image of the first frame.

Then, the flow of the processing goes on to the next step S230 to determine whether or not all frames serving as the subject of processing have been processed. If not all frames serving as the subject of processing have been processed, the flow of the processing goes on to a step S235 at which the frame number N is incremented by 1. In this case, the number N assigned to the frame to be processed becomes equal to 1. FIG. 8 is a diagram showing a typical left-eye-oriented image (raw image) 34L of the input first frame having the first data format.

Processing to Estimate the Gain Map $EG_N$

Figure 10:
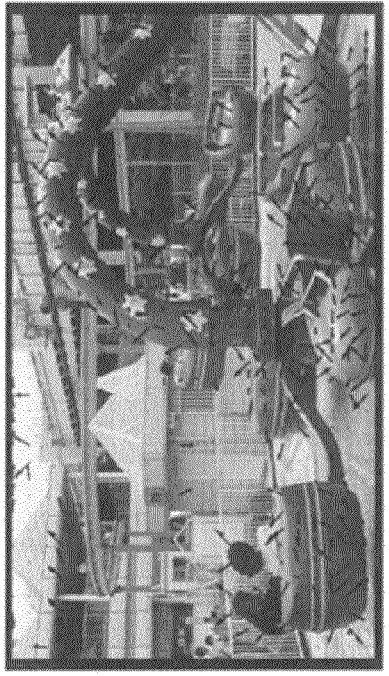
FIG. 10 is an explanatory diagram showing motion vectors between the 0th and $1^{st}$ frames.

Next, at the step S240, the processing to estimate the gain map $EG_N$ (estimated values) is carried out. To put it concretely, the processing to estimate the gain map $EG_N$ (estimated values) is carried out at steps of a flowchart shown in FIG. 4. As shown in this figure, the flowchart begins with a step S405 at which the correlation estimation section 20 makes use of images shown in FIG. 5 as the images of the 0th frame and an image shown in FIG. 8 as the image of the first frame immediately following the 0th frame to form two consecutive frames in order to estimate a motion vector shown in FIG. 9 as a motion vector between every two corresponding pixels on the two consecutive frames by adoption of the block matching method or the gradient method. FIG. 10 is an explanatory diagram showing a left-eye-oriented image 35L making use of an arrow to make every motion vector between the 0th and first frames clearly visible.

Figure 11:
FIG. 11 is a diagram showing a typical left-eye-oriented gain map EG of the first frame.

Then, at the next step S410, the gain generation section 16 makes use of motion vectors to estimate a gain map $EG_1$ (estimated values) of the first frame from the gain map $CG_0$ of the 0th frame. FIG. 11 is a diagram showing a typical left-eye-oriented gain map $EG_1$ (estimated values) denoted by reference numeral 35L as a left-eye-oriented gain map $EG_1$ (estimated values) of the first frame.

After completing the process of the step S410 of the flowchart shown in FIG. 4 as described above, the flow of the processing again goes back to a step S245 of the flowchart shown in FIG. 2. At the step S245, the frame number N is examined in order to determine whether or not the frame number is a multiple of the period value. In this case, since the period value is 5 whereas the frame number N is 1, the frame number N is not a multiple of the period value. Thus, the flow of the processing again goes on to a step S250 at which the contrast adjustment section 17 makes use of the gain map $EG_1$ (estimated values) in order to adjust the contrast components of the three-dimensional moving image. Then, at the next step S225, on the basis of the result of the contrast adjustment carried out by the contrast adjustment section 17, the image outputting section 19 converts a luminance image obtained as a result of the adjustment of contrast components into the same specific frame of the three-dimensional moving image as the three-dimensional moving image supplied to the image inputting section 11 and supplies the three-dimensional moving image obtained as the result of the conversion to the display apparatus 30.

The processes of the steps S230 to S250 and S225 are carried out repeatedly till the frame number N is found equal to a multiple of the period value at the step S245. It is to be noted that, at the step S410, for the second frame and frames subsequent to the second frame, the gain generation section 16 estimates a gain map $EG_N$ (estimated values) of the Nth frame from the gain map $EG_{N-1}$ of the (N−1)th frame.

Processing to Generate the Gain Map $MG_N$

Figure 13:
FIG. 13 is a diagram showing a typical left-eye-oriented gain map EG of the fifth frame.

First of all, as described above, the processing to estimate the gain map $EG_N$ (estimated values) has been carried out at the step S240. As a result, the gain map $EG_5$ (estimated values) of the fifth frame is generated. FIG. 13 is a diagram showing a typical left-eye-oriented gain map $EG_5$ (estimated values) denoted by reference numeral 38L as a gain map of the fifth frame.

Next, since the frame number N is found equal to a multiple of the period value at the step S245, the flow of the processing goes on from the step S245 to the step S255 at which the gain generation section 16 carries out processing to compute a gain map $CG_5$ of the fifth frame on the basis of the left-eye-oriented image 37L and the right-eye-oriented image 37R which are shown in FIG. 12 as the images of the fifth frame in the same way as the step S210 described before.

Figure 14:
FIG. 14 is a diagram showing a typical left-eye-oriented disparity map of the fifth frame.
Figure 15:
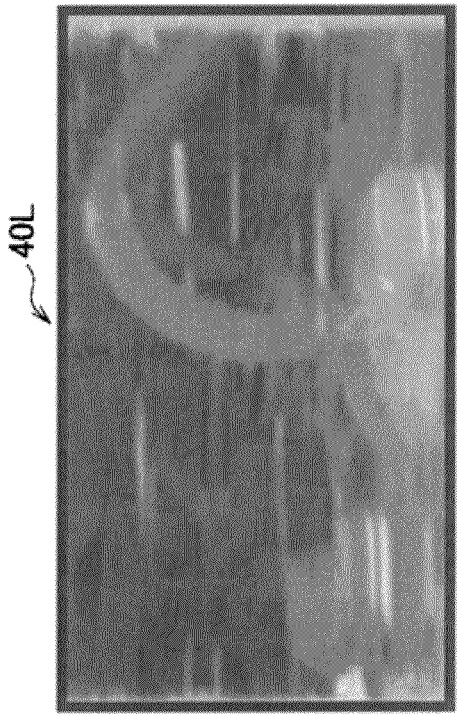
FIG. 15 is a diagram showing a typical left-eye-oriented gain map CG of the fifth frame.

As explained earlier by referring to the flowchart shown in FIG. 3, the process of computing a gain map $CG_N$ (computed values) at the steps S210 and S255 includes a variety of extractions carried out at steps S305 to S315 of the flowchart shown FIG. 3. Then, at the next step S320, a disparity map for the fifth frame is created from the extracted depth information. Subsequently, at the next step S325, on the basis of the disparity map, the gain generation section 16 computes a contrast-adjustment-oriented gain map $CG_5$ of the fifth frame. FIG. 14 is a diagram showing a typical left-eye-oriented disparity map 39L of the fifth frame whereas FIG. 15 is a diagram showing a typical left-eye-oriented gain map $CG_5$ (computed values) denoted by reference numeral 40L as a gain map of the fifth frame.

Figure 16:
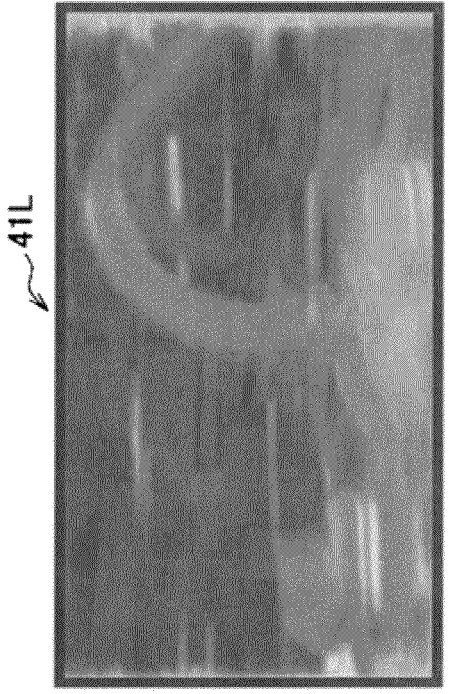
FIG. 16 is a diagram showing a typical left-eye-oriented gain map MG of the fifth frame.

Then, the flow of the processing goes back to a step S260 of the flowchart shown in FIG. 2. At the step S260, the gain generation section 16 carries out typical processing to add the computed gain map $CG_5$ of the fifth frame to the estimated gain map $EG_5$ of the fifth frame to find a sum and compute an average gain map $MG_5$ of the fifth frame from the sum. As alternative processing, the gain generation section 16 carries out weighted addition on the computed gain map $CG_5$ of the fifth frame and the estimated gain map $EG_5$ of the fifth frame by making use of weights determined in advance in order to find a gain map $MG_5$ of the fifth frame. In the case of the typical processing, the average gain map $MG_5$ of the fifth frame is computed in accordance with the following equation: $MG_5=(CG_5+EG_5)/2$. FIG. 16 is a diagram showing a typical left-eye-oriented gain map $MG_5$ denoted by reference numeral 41L as a gain map of the fifth frame.

Then, at the next step S265, the contrast adjustment section 17 makes use of the gain map $MG_5$ (generated values) to adjust the contrast components of the three-dimensional moving image. Subsequently, at the next step S225 described earlier, on the basis of the result of the contrast adjustment carried out by the contrast adjustment section 17, the image processing section 18 generates a luminance image resulting from the contrast adjustment carried out by the contrast adjustment section 17. Then, the image outputting section 19 converts a combined image into the same specific frame as the three-dimensional moving image supplied to the image inputting section 11 and supplies the three-dimensional moving image obtained as the result of the conversion to the display apparatus 30. The combined image is an image obtained by combining the luminance image generated by the image processing section 18 with the original color information of the input image. The processing described above is carried out repeatedly for all frames till the last frame is processed.

As described above, in accordance with the image processing method implemented by the image processing apparatus 10 according to the embodiment, in the case of the 0th frame used as the first subject of the processing, the processing to extract depth information, the processing to extract contrast components and the processing to extract spatial frequency components are carried out to find a gain map $CG_0$, and the processing to adjust contrast components is carried out on the basis of the gain map $CG_0$.

If the subject of the processing is the first frame or a subsequent frame, on the other hand, the direction of a motion vector and the length of the vector are estimated from two frames consecutive along the time axis to recognize a correlation between every two corresponding pixels on the two frames respectively in order to infer information indicating which object is moving to which position on the next frame. If the movement of each object is known from such information, on the basis of correlations between frames, information on an object on a preceding frame can be passed down to the succeeding frame so that a gain map $EG_N$ estimated by such a succession of information can be used in the processing to adjust contrast components of the succeeding frame. Typical examples of the information on an object on a preceding frame include the depth information and the contrast components. Thus, if the processing to extract depth information, the processing to extract contrast components and the processing to extract spatial frequency components which are carried out on the 0th frame are performed independently for every frame, an eyesore phenomenon such as an appearance of flickers may occur in some cases. However, the embodiment is capable of avoiding such a phenomenon. As a result, it is possible to provide the viewer with a smooth three-dimensional moving image whose sense of depth has been corrected appropriately.

As described above, if the Nth frame serving as the subject of processing is not Kth frame where K is a multiple of the period value M which is the value of the reset period as described above, a movement of an object on the next frame is predicted from a movement of the object on the present frame by adoption of the movement prediction technology. Thus, it is not necessary to carry out the processing to extract depth information, the processing to extract contrast components and the processing to extract spatial frequency components as described earlier repeatedly for every frame. In particular, the computation of the depth information entails a heavy processing load. Thus, by eliminating these kinds of processing, the load imposed by processing carried out on subsequent frames can be reduced.

However, if the scene changes all of a sudden for example, information based on a motion vector to serve as information on succession between frames conceivably includes a number of errors. Thus, when the Nth frame serving as the subject of processing becomes a Kth frame where K is equal to a multiple of M which is the reset period, information based on a motion vector to serve as information on succession between frames is reset. At that time, instead of completely resetting the information on succession between frames, the gain generation section 16 carries out processing to add the estimated gain map $EG_N$ serving as the information on succession from a preceding frame to a newly computed gain map $CG_N$ in order to find a sum and compute an average gain map $MG_N$ from the sum of the estimated gain map $EG_N$ serving as the information on succession from a preceding frame and the newly computed gain map $CG_N$. As an alternative, the gain generation section 16 carries out weighted addition on the newly computed gain map $CG_N$ and the estimated gain map $EG_N$ by making use of weights determined in advance in order to find a gain map $MG_N$. In this way, the gain map $MG_N$ can be found from, among others, the information on predicted motion vectors, the contrast components of the image, the depth information of the image and the spatial frequency components of the image. By finding the gain map $MG_N$, it is possible to reduce the number of errors included in the information on succession between frames and the number of eyesore phenomena such as appearances of flickers. As a result, it is possible to adjust the contrast components of an image with a high degree of precision by making use of the gain map $MG_N$.

It is to be noted that the period value M of M frames can be set a value varying in accordance with changes of the input three-dimensional moving image. Typically, the larger the change of the input three-dimensional moving image, the smaller the period value M of M frames. In other words, the smaller the change of the input three-dimensional moving image, the larger the period value M of M frames. If there are only few movements in the image as is the case with a scenery image, the period value M of M frames can be set at 10 for 10 frames. The value of 10 is determined as a result of presumption of a low frequency at which an error is introduced into information on succession from the preceding frame to the succeeding frame. If there are a number of movements in the image as is the case with a sport-event image, on the other hand, the period value M of M frames can be set at 1 or 2 for 1 or 2 frames respectively. The value of 1 or 2 is determined as a result of presumption of a high frequency at which an error is introduced into information on succession from the preceding frame to the succeeding frame. However, the smaller the value at which the period value M is set, the heavier the load of the processing.

In addition, the period value M of M frames can also be set for every content of the input three-dimensional moving image. There are also cases in which the period value M for a content would rather be made variable. If a video content includes a scene with strenuous movements and a scene with loose movements for example, for the scene with loose movements, the period value M is set at a large value but, for the scene with strenuous movements, on the other hand, the period value M is set at a small value. In this way, the period value M for the same content can be set at different values.

In the image processing apparatus 10 according to the embodiment described above, operations (or processes) carried out by the sections employed in the image processing apparatus 10 are related to each other. Therefore, by considering the relations between the operations or the processes into consideration, the operations or the processes can be replaced with a sequence of operations or a sequence of processes. Thus, the embodiment of the image processing apparatus 10 can be implemented as an embodiment of an image processing method and an embodiment of an image processing program to be executed by a computer to carry out the functions of the image processing apparatus 10.

Accordingly, it is possible to provide an image processing method having:

a depth-information extraction step of extracting the depth information of the image of an Mth frame of an input three-dimensional moving image;

a luminance extraction step of extracting luminance components of the image of the Mth frame of the input three-dimensional moving image;

a contrast extraction step of extracting contrast components of the image of the Mth frame of the input three-dimensional moving image on the basis of the luminance components of the image of the Mth frame;

a gain generation step of computing a gain map CG for adjusting contrast components of the image of the Mth frame on the basis of the contrast components of the image of the Mth frame and the depth information of the image of an Mth frame; and a correlation estimation step of computing values of correlations between images of at least two frames including an (N−1)th frame and an Nth frame (where N>0).

The gain generation step includes a step of estimating a gain map EG for adjusting the contrast components of the image of the Nth frame from the computed gain map CG for adjusting the contrast components of the image of the Mth frame and the computed correlation values.

In addition, it is also possible to provide an image processing program to be executed by a computer in order to carry out processing including:

a depth-information extraction process of extracting the depth information of the image of an Mth frame of an input three-dimensional moving image;

a luminance extraction process of extracting luminance components of the image of the Mth frame of the input three-dimensional moving image;

a contrast extraction process of extracting contrast components of the image of the Mth frame of the input three-dimensional moving image on the basis of the luminance components of the image of the Mth frame;

a gain generation process of computing a gain map CG for adjusting contrast components of the image of the Mth frame on the basis of the contrast components of the image of the Mth frame and the depth information of the image of an Mth frame; and a correlation estimation process of computing values of correlations between images of at least two frames including an (N−1)th frame and an Nth frame (where N>0).

The gain generation process includes a process of estimating a gain map EG for adjusting the contrast components of the image of the Nth frame from the computed gain map CG for adjusting the contrast components of the image of the Mth frame and the computed correlation values.

A preferred embodiment of the present disclosure has been explained in detail so far by referring to diagrams. However, implementations of the present disclosure are by no means limited to the embodiment. It is obvious that a person having ordinary knowledge in the field of technologies of the present disclosure is capable of coming up with a variety of typical changes to be made to the embodiment and a variety of typical modifications of the embodiment within a range of technological concepts described in ranges of claims appended to this specification. However, each of such typical changes and each of such typical modifications are of course also interpreted as respectively a change and a modification which fall within the ranges of the claims for the present disclosure.

For example, in accordance with a typical method provided by the embodiment described above as a method for estimating motion vectors, values of correlations between the three-dimensional moving image of the Nth frame and the three-dimensional moving image of the (N−1)th frame immediately preceding the Nth frame are used for estimating motion vectors between the images. However, techniques each provided by the present disclosure as a technique for estimating motion vectors are by no means limited to this typical method. For example, motion vectors are estimated by making use of not only values of correlations between images of the Nth frame and the (N−1)th frame immediately preceding the Nth frame, but also values of correlations between images of the Nth frame and a plurality of preceding frames such as the (N−1)th and (N−2)th frames. In this case, correlation values are found by making use of the preceding frames as follows. For example, images of the (N−1)th and (N−2)th frames are used to find values of correlations between the three-dimensional moving images of the (N−1)th and (N−2)th frames. Then, images of the Nth and (N−1)th frames are used to find values of correlations between the three-dimensional moving images of the Nth and (N−1)th frames. Finally, motion vectors of the Nth frame are estimated from the correlation values.

The period value can be set at 1. In this case, the gain map CG is computed for every frame and the gain map EG is estimated also for every frame.

In addition, also at a reset time, in the same way as the first frame, the gain map EG for adjusting the contrast components of the Nth frame can be estimated from the computed gain map CG for adjusting the contrast components of the Mth frame and the correlation values. For example, at a reset time according to this embodiment, the gain map MG is used. However, the gain map EG can also be used.

It is to be noted that, in this embodiment, processes of steps described in every flowchart can of course be carried out sequentially along the time axis in the order described in the flowchart. However, the processes of steps in every flowchart do not have to be processes carried out sequentially along the time axis in the order described in the flowchart. For example, the processes may also include processes carried out concurrently or independently of each other. In addition, it is needless to say that the order of processes to be carried out sequentially along the time axis can be properly changed in some cases.

The present disclosure contains subject matter related to that disclosed in Japanese Priority Patent Application JP 2010-265647 filed in the Japan Patent Office on Nov. 29, 2010, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. An image processing apparatus comprising:
at least one image processor having a depth-information extraction section, a luminance extraction section, a contrast extraction section, a gain generation section, and a correlation estimation section,
wherein
said depth-information extraction section is configured to extract depth information of an image of an Mth frame of an input moving image,
said luminance extraction section is configured to extract luminance components of said image of said Mth frame of said input moving image,
said contrast extraction section is configured to extract contrast components of said image of said Mth frame of said input moving image on the basis of said luminance components of said image of said Mth frame,
said gain generation section is configured to compute a gain map CG for adjusting contrast components of said image of said Mth frame on the basis of said contrast components of said image of said Mth frame and said depth information of said image of said Mth frame,
said correlation estimation section is configured to compute values of correlations between images of at least two frames including an (N−1)th frame and an Nth frame (where N>0), and
said gain generation section is configured to estimate a gain map EG for adjusting contrast components of said image of said Nth frame from said computed gain map CG for adjusting said contrast components of said image of said Mth frame and said computed correlation values.

2. The image processing apparatus according to claim 1 wherein said Mth frame is configured from at least one of a 0th frame and a Kth frame where K is a multiple of a period value which is the value of a reset period.

3. The image processing apparatus according to claim 2, wherein,
said correlation estimation section is configured to compute values of correlations between the image of said Nth frame and the image of said (N−1)th frame, and
said gain generation section is configured to estimate said gain map EG for adjusting contrast components of said Nth frame from said gain map EG for adjusting contrast components of said (N−1)th frame based on said computed values of said correlations between said images of said Nth and (N−1)th frames.

4. The image processing apparatus according to claim 3, wherein, said correlation estimation section is configured to compute values of correlations between said image of said Nth frame and said image of said (N−1)th frame for all frames except said 0th frame, and said gain generation section is configured to estimate said gain map EG for adjusting contrast components of the image of said Nth frame from said computed correlation values and said gain map EG for adjusting contrast components of the image of said (N−1)th frame for all frames except said 0th frame.

5. The image processing apparatus according to claim 2 wherein, if said Nth frame matches said Mth frame, said gain generation section carries out adding and averaging processing or weighted addition processing based on predetermined weights on (i) said estimated gain map EG for adjusting contrast components of the image of said Nth frame, and (ii) said computed gain map CG for adjusting contrast components of the image of said Mth frame to generate a gain map MG for adjusting said contrast components of said image of said Nth frame.

6. The image processing apparatus according to claim 2 wherein said period value for M frames is set at a variable value determined based on a change of said input moving image.

7. The image processing apparatus according to claim 6 wherein, the larger the movement of said input moving image, the smaller the value at which said period value for said M frames is set or, the smaller the movement of said input moving image, the larger the value at which said period value for said frames is set.

8. The image processing apparatus according to claim 2, further including:

a contrast adjustment section configured to adjust contrast components of the image of said Nth frame based on (i) said computed gain map CG for adjustment of contrast components, (ii) said estimated gain map EG for adjustment of contrast components, or (iii) said generated gain map MG for adjustment of contrast components.

9. The image processing apparatus according to claim 1 wherein said correlation estimation section is configured to compute said correlation value based on a movement prediction technology.

10. The image processing apparatus according to claim 1, wherein, said image processing apparatus further includes a spatial-frequency component extraction section configured to extract spatial-frequency components of the image of said Mth frame on the basis of said luminance components of said image of said Mth frame, and said gain generation section is configured to compute a gain map CG for adjusting contrast components of said image of said Mth frame on the basis of said contrast components of said image of said Mth frame, said spatial-frequency components of said image of said Mth frame, and said depth information of said image of said Mth frame.

11. A display apparatus comprising an image processing apparatus, said image processing apparatus having:

a depth-information extraction section configured to extract depth information of an image of an Mth frame of an input moving image;

a luminance extraction section configured to extract luminance components of said image of said Mth frame of said input moving image;

a contrast extraction section configured to extract contrast components of said image of said Mth frame of said input moving image on the basis of said luminance components of said image of said Mth frame;

a gain generation section configured to compute a gain map CG for adjusting contrast components of said image of said Mth frame on the basis of said contrast components of said image of said Mth frame and said depth information of said image of said Mth frame;

a correlation estimation section configured to compute values of correlations between images of at least two frames including an (N−1)th frame and an Nth frame (where N>0); and a contrast adjustment section configured to adjust contrast components of the image of said Nth frame based on said computed gain map CG for adjustment of contrast components of said image of said Mth frame and said computed correlation values, wherein, said display apparatus is configured to display the image of every frame whose contrast components have been adjusted by said image processing apparatus.

12. An image processing method including:

a depth-information extraction step of extracting depth information of an image of an Mth frame of an input moving image;

a luminance extraction step of extracting luminance components of said image of said Mth frame of said input moving image;

a contrast extraction step of extracting contrast components of said image of said Mth frame of said input moving image on the basis of said luminance components of said image of said Mth frame;

a gain generation step of computing a gain map CG for adjusting contrast components of said image of said Mth frame on the basis of said contrast components of said image of said Mth frame and said depth information of said image of said Mth frame; and a correlation estimation step of computing values of correlations between images of at least two frames including an (N−1)th frame and an Nth frame (where N>0), wherein, said gain generation step includes a step of estimating a gain map EG for adjusting contrast components of said image of said Nth frame from said computed gain map CG for adjusting said contrast components of said image of said Mth frame and said computed correlation values.

13. An image processing program stored on a non-transitory computer readable medium to be executed by a computer in order to carry out processing including:

a depth-information extraction process of extracting depth information of an image of an Mth frame of an input moving image;

a luminance extraction process of extracting luminance components of said image of said Mth frame of said input moving image;

a contrast extraction process of extracting contrast components of said image of said Mth frame of said input moving image on the basis of said luminance components of said image of said Mth frame;

a gain generation process of computing a gain map CG for adjusting contrast components of said image of said Mth frame on the basis of said contrast components of said image of said Mth frame and said depth information of said image of said Mth frame; and a correlation estimation process of computing values of correlations between images of at least two frames including an (N−1)th frame and an Nth frame (where N>0), wherein, said gain generation process includes a process of estimating a gain map EG for adjusting contrast components of said image of said Nth frame from said computed gain map CG for adjusting said contrast components of said image of said Mth frame and said computed correlation values.

14. An image processing apparatus comprising:

at least one image processor having a correlation estimation section, and a gain generation section, wherein, said correlation estimation section configured to compute values of correlations between images of two input consecutive frames; and a gain generation section configured (i) to compute computation-result gains for adjusting contrast components of an input image on the basis of contrast components of said input image and depth information of said input image and, (ii) to estimate an estimation-result gains for adjusting said contrast components of said input image from said computation-result gains and said correlation values, wherein, said gain generation section is configured to estimate (i) said estimation-result gains of an image of an Nth frame from said computation-result gains of the image of a (N−1)th frame, and (ii) values of correlations between the images of said (N−1)th and Nth frames, and said gain generation section is configured to estimate a gain map EG for adjusting contrast components of said image of said Nth frame based on said computed computation-result gains for adjusting contrast components of an image of an Mth frame and said computed correlation values.

15. The image processing apparatus according to claim 14 wherein said gain generation section estimates said estimation-result gains of the image of a Pth frame from said estimation-result gains of the image of a (P−1)th frame as well as values of correlations between the images of said (P−1)th and Pth frames.

16. The image processing apparatus according to claim 14 wherein said gain generation section carries out adding and averaging processing or weighted addition processing based on predetermined weights on said estimation-result gains of the image of a Qth frame and said computation-result gains of said image of said Qth frame in order to generate compound gains of said image of said Qth frame.

17. An image processing apparatus comprising:

at least one image processor having a gain generation section, a contrast extraction section, and a correlation estimation section, wherein, said gain generation section is configured to compute first gains on the basis of contrast components of an image of a first frame and depth information of said image of said first frame, said contrast adjustment section is configured to adjust contrast components of said image of said first frame on the basis of said first gains, said correlation estimation section is configured to compute values of correlations between said image of said first frame and an image of a second frame, said images including images of an (N−1)th frame and an Nth frame, said contrast adjustment section is configured to adjust contrast components of said image of said second frame based on said first gains and said correlation values, said gain generation section is configured to estimate (i) estimation-result gains of an image of an Nth frame from said computation-result gains of the image of a (N−1)th frame, and (ii) values of correlations between the images of said (N−1)th and Nth frames, and said gain generation section is configured to estimate a gain map EG for adjusting contrast components of said image of said Nth frame based on said computed first gains for adjusting contrast components of an image of an Mth frame and said computed correlation values.

* * * * *